United States Patent
Choi et al.

(10) Patent No.: US 11,631,848 B2
(45) Date of Patent: Apr. 18, 2023

(54) POSITIVE ELECTRODE FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Jaeho Choi, Yongin-si (KR); Jungmin Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 153 days.

(21) Appl. No.: 16/414,629

(22) Filed: May 16, 2019

(65) Prior Publication Data
US 2019/0363358 A1 Nov. 28, 2019

(30) Foreign Application Priority Data

May 23, 2018 (KR) .................. 10-2018-0058282
Feb. 27, 2019 (KR) .................. 10-2019-0023354

(51) Int. Cl.
*H01M 4/00* (2006.01)
*H01M 4/525* (2010.01)
(Continued)

(52) U.S. Cl.
CPC ........... *H01M 4/525* (2013.01); *H01M 4/131* (2013.01); *H01M 4/1391* (2013.01);
(Continued)

(58) Field of Classification Search
CPC .... H01M 4/525; H01M 4/131; H01M 4/1391; H01M 4/505; H01M 10/0525;
(Continued)

(56) References Cited

U.S. PATENT DOCUMENTS

| | | | |
|---|---|---|---|
| 2011/0020708 A1* | 1/2011 | Fujiki | H01M 4/366 429/231.95 |
| 2014/0302388 A1* | 10/2014 | Li | C01G 53/50 429/209 |

(Continued)

FOREIGN PATENT DOCUMENTS

| | | |
|---|---|---|
| CN | 105247711 A | 1/2016 |
| KR | 10-2006-0133615 A | 12/2006 |

(Continued)

OTHER PUBLICATIONS

Machine translation of WO 2017/057078 A1, obtained Jan. 21, 2021 (Year: 2017).*

(Continued)

*Primary Examiner* — Nicholas P D'Aniello
(74) *Attorney, Agent, or Firm* — Lewis Roca Rothgerber Christie LLP

(57) ABSTRACT

Disclosed are a positive electrode for a rechargeable lithium battery and a rechargeable lithium battery including the same. The positive electrode includes a current collector and a positive electrode layer on the current collector, the positive electrode layer including a nickel-based positive active material of Chemical Formula 1 having a BET specific surface area of about 0.5 m²/g to about 2.5 m²/g, a metal fluoride, a conductive material, and a binder, wherein an amount of the metal fluoride is about 1 wt % to about 10 wt % based on 100 wt % of the positive electrode layer. In Chemical Formula 1, 0.9≤a≤1.1, 0.8≤x≤0.98, 0.01≤y≤0.01≤z≤0.1, x+y+z=1, and A is Mn or Al.

$Li_aNi_xCo_yA_zO_2$      Chemical Formula 1

8 Claims, 1 Drawing Sheet

(51) Int. Cl.
    *H01M 4/131*     (2010.01)
    *H01M 4/1391*     (2010.01)
    *H01M 4/505*     (2010.01)
    *H01M 10/0525*     (2010.01)
    *H01M 4/02*     (2006.01)

(52) U.S. Cl.
    CPC ....... *H01M 4/505* (2013.01); *H01M 10/0525* (2013.01); *H01M 2004/021* (2013.01); *H01M 2004/028* (2013.01)

(58) Field of Classification Search
    CPC ..... H01M 2004/021; H01M 2004/028; H01M 4/362; H01M 4/485; H01M 4/628; H01M 10/052; Y02E 60/10
    See application file for complete search history.

(56) References Cited

U.S. PATENT DOCUMENTS

| | | | |
|---|---|---|---|
| 2016/0099460 | A1 | 4/2016 | Toyama et al. |
| 2016/0372748 | A1 | 12/2016 | Nakayama et al. |

FOREIGN PATENT DOCUMENTS

| | | | |
|---|---|---|---|
| KR | 10-2007-0117826 | A | 12/2007 |
| KR | 10-2014-0058800 | A | 5/2014 |
| KR | 10-2014-0116274 | A | 10/2014 |
| KR | 10-2016-0030878 | A | 3/2016 |
| WO | WO 2006/137673 | A1 | 12/2006 |
| WO | WO 2017/057078 | A1 | 4/2017 |

OTHER PUBLICATIONS

Extended European Search Report for corresponding European Patent Application No. 19174237.8, dated Aug. 27, 2019, 12 pages.
Amalraj, Francis et al.; Studies of Li and Mn-Rich $Li_x[MnNiCo]O_2$ Electrodes: Electrochemical Performance, Structure, and the Effect of the Aluminum Fluoride Coating, Journal of the Electrochemical Society, vol. 160, No. 11, Oct. 12, 2013, XP055424534, pp. A2220-A2233.
Sun, Yang-Kook, et al.; The Role of $AlF_3$ Coatings in Improving Electrochemical Cycling of Li-Enriched Nickel-Manganese Oxide Electrodes for Li-Ion Batteries, Advanced Materials, vol. 24, No. 9, Jan. 25, 2012, XP055266279, pp. 1192-1196.
Woo, S.-U., et al.; Significant Improvement of Electrochemical Performance of $AlF_3$-Coated $Li[Ni_{0.8}Co_{0.1}Mn_{0.1}]O_2$ Cathode Materials, Journal of the Electrochemical Society, vol. 154, No. 11, XP055611842, Sep. 7, 2007, 5 pages.
Korean Intellectual Property Office Action for corresponding Korean Patent Application No. 10-2019-0056294, dated Aug. 14, 2020, 8 pages.
Lee, Sang-Hyuk, et al., "Improvement of long-term cycling performance of $Li[Ni_{0.8}Co_{0.15}Al_{0.05}]O_2$ by $AlF_3$ coating", Journal of Power Sources 234 (2013), Feb. 1, 2013, pp. 201-207.
Korean Intellectual Property Office, Notice of Allowance issued in corresponding Korean Patent Application No. 10-2019-0056294, dated Feb. 4, 2021, 5 pages.
Office Action for corresponding European Patent Application No. 19174237.8, dated Jul. 6, 2021 (6 pages).
Office Action dated Jan. 30, 2022, and accompanying Search Report dated Jan. 25, 2022, of the corresponding Chinese Patent Application No. 201910422778.4, including English translation, 17pp.
Office Action (Decision of Rejection) dated Dec. 1, 2022, of the corresponding Chinese Patent Application No. 201910422778.4, 12pp.

* cited by examiner

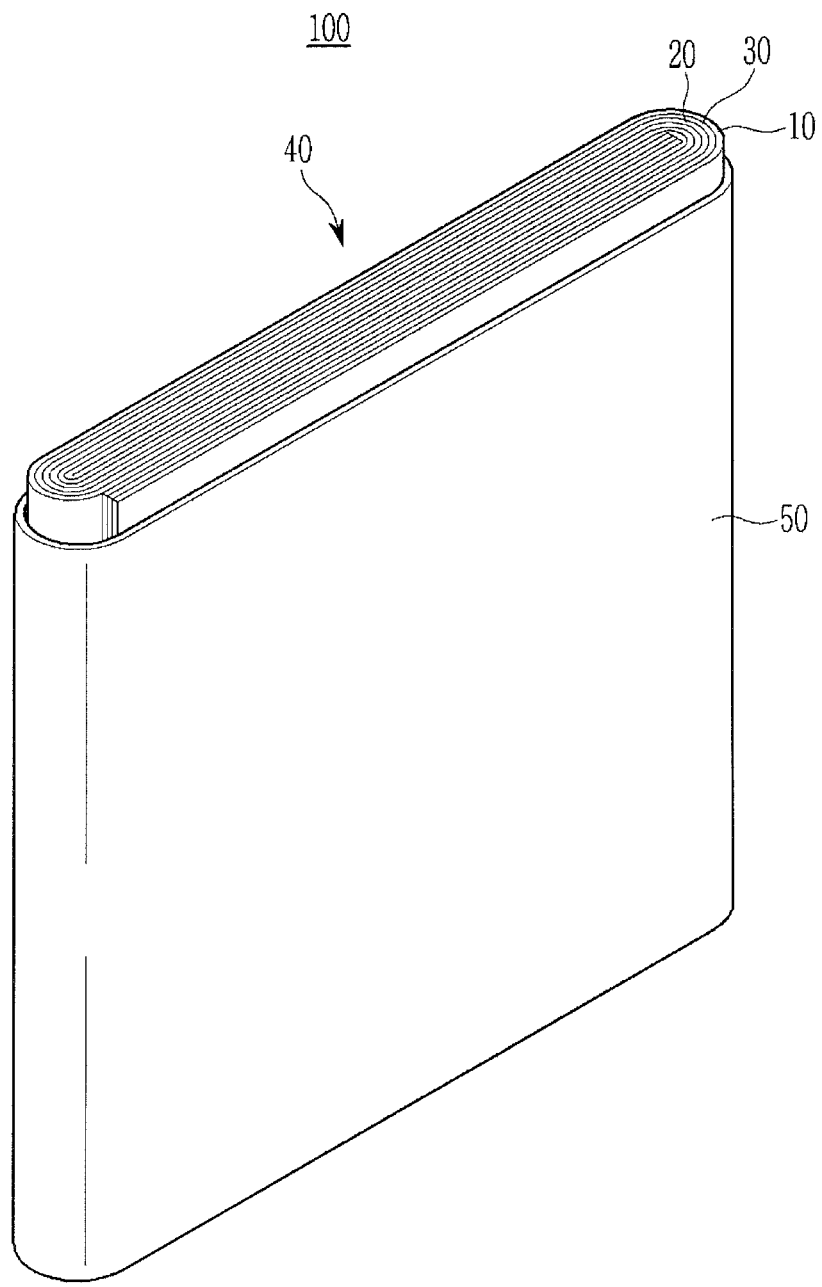

POSITIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2018-0058282 filed in the Korean Intellectual Property Office on May 23, 2018, and Korean Patent Application No. 10-2019-0023354 filed in the Korean Intellectual Property Office on Feb. 27, 2019, the entire contents of each of which are incorporated herein by reference.

BACKGROUND

1. Field

A positive electrode for a rechargeable lithium battery and a rechargeable lithium battery including the same are disclosed.

2. Description of the Related Art

A rechargeable lithium battery has recently drawn attention as a power source for small portable electronic devices.

Such a rechargeable lithium battery includes a positive electrode including a positive active material, a negative electrode including a negative active material, a separator between the positive electrode and the negative electrode, and an electrolyte.

The negative active material may include various suitable carbon-based materials capable of intercalating/deintercalating lithium such as, for example, artificial graphite, natural graphite, hard carbon, a Si-based active material, and/or the like.

The positive active material may include an oxide including lithium and a transition metal and having a structure capable of intercalating lithium ions such as $LiCoO_2$, $LiMn_2O_4$, $LiNi_{1-x}Co_xO_2$ (0<x<1), $LiNi_{1-x-y}Co_xA_yO_2$ (0<x+y<1, and A is Mn or Al).

SUMMARY

An embodiment provides a positive electrode for a rechargeable lithium battery having improved adherence to a current collector, cycle-life characteristics, and storage characteristics at a high temperature.

Another embodiment provides a rechargeable lithium battery including the positive electrode.

An embodiment provides a positive electrode for a rechargeable lithium battery including a current collector and a positive electrode layer on the current collector, the positive electrode layer including a nickel-based positive active material represented by Chemical Formula 1 having a BET specific surface area of about 0.5 m²/g to about 2.5 m²/g, a metal fluoride, a conductive material, and a binder, wherein an amount of the metal fluoride is about 1 wt % to about 10 wt % based on 100 wt % of the positive electrode layer.

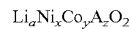

Chemical Formula 1

In Chemical Formula 1, $0.9 \leq a \leq 1.1$, $0.8 \leq x \leq 0.98$, $0.01 \leq y \leq 0.1$, $0.01 \leq z \leq 0.1$, $x+y+z=1$, and A is Mn or Al.

Another embodiment provides a method of manufacturing a positive electrode for a rechargeable lithium battery including mixing a nickel-based positive active material represented by Chemical Formula 1 having a BET specific surface area of about 0.5 m²/g to about 2.5 m²/g, a metal fluoride, a binder, and a conductive material in a solvent to prepare a positive active material composition; and coating the positive active material composition on a current collector, wherein the metal fluoride is used in an amount of about 1 wt % to about 10 wt % based on a total amount, 100 wt % of the nickel-based positive active material, the metal fluoride, the binder, and the conductive material.

The metal fluoride may be Al fluoride, Mg fluoride, Zr fluoride, Bi fluoride, or a combination thereof.

Another embodiment provides a rechargeable lithium battery including the positive electrode; a negative electrode including a negative active material; and an electrolyte.

Other embodiments of the present disclosure are included in the following detailed description.

The positive electrode for a rechargeable lithium battery according to an embodiment may provide a rechargeable lithium battery having improved adherence to a current collector and improved cycle-life characteristics and storage characteristics at a high temperature.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure. The accompanying drawing is a schematic view showing a structure of a rechargeable lithium battery according to an embodiment.

DETAILED DESCRIPTION

Hereinafter, embodiments of the present disclosure are described in more detail. However, these embodiments are exemplary, the present disclosure is not limited thereto and the present disclosure is defined by the scope of claims, and equivalents thereof.

As used herein, when a definition is not otherwise provided, the term "average particle diameter (D50)" indicates a particle diameter at which 50 volume % (or 50 mass %) of the particles in a particle distribution have a smaller particle diameter, as measured by, for example, a PSA (particle size analyzer).

As used herein, the terms "upper" and "lower" are defined with reference to the drawings, wherein "upper" may be changed to "lower" and "lower" may be changed to "upper" according to a viewing position, and "on" may include not only positioning directly thereon, but also intervening other structures in the middle. On the other hand, what is referred to as "directly on" refers to positioning without other structures therebetween. In addition, it will also be understood that when an element or layer is referred to as being "between" two elements or layers, it can be the only element or layer between the two elements or layers, or one or more intervening elements or layers may also be present.

An embodiment of the present disclosure provides a positive electrode for a rechargeable lithium battery including a current collector and a positive electrode layer on the current collector, wherein the positive electrode layer includes a nickel-based positive active material represented by Chemical Formula 1 having a BET specific surface area of greater than or equal to about 0.5 m$^2$/g, a metal fluoride, a conductive material, and a binder.

$$Li_aNi_xCo_yA_zO_2 \quad \text{Chemical Formula 1}$$

In Chemical Formula 1, 0.9≤a≤1.1, 0.8≤x≤0.98, 0.01≤y≤0.1, 0.01≤z≤0.1, x+y+z=1, and A is Mn or Al.

In one embodiment, in Chemical Formula 1, 0.9≤a≤1.1, 0.9≤x≤0.98, 0.01≤y≤0.1, 0.01≤z≤0.1, x+y+z=1, and A is Mn or Al. For example, in Chemical Formula 1, 0.9≤a≤1.1, 0.9≤x≤0.98, 0.01≤y≤0.1, 0.01≤z≤0.03, x+y+z=1, and A is Mn or Al. For example, in Chemical Formula 1, 0.9≤a≤1.1, 0.9≤x≤0.94, 0.05≤y≤0.1, 0.01≤z≤0.03, x+y+z=1, and A is Mn or Al. In embodiments, the nickel-based positive active material may be $Li_1Ni_{0.91}Co_{0.07}Al_{0.02}O_2$.

The BET specific surface area may be greater than or equal to about 0.5 m$^2$/g. For example, it may be about 0.5 m$^2$/g to about 2.5 m$^2$/g, about 1 m$^2$/g to about 2.5 m$^2$/g, about 1.5 m/g to about 2.5 m$^2$/g, about 2 m$^2$/g to about 2.5 m$^2$/g, or about 2.1 m$^2$/g to about 2.2 m$^2$/g (e.g., about 2.11 m$^2$/g).

With respect to Chemical Formula 1, the positive active material having a Ni content of greater than or equal to about 80 mol % may generate a large amount of gas generally due to the presence of an excessive amount of residual Li, which reacts with an electrolyte on being exposed to a high temperature, thereby causing deterioration of the thermal stability. In order to reduce the residual Li content, a treatment in which the positive active material may be washed with water, may be performed. For example, when performing the water washing, the specific surface area may be remarkably increased, thereby causing problems in that the capacity is deteriorated, and the cycle-life is significantly decreased. In order to prevent or reduce the above-referenced problems, for example, to reduce the BET specific surface area, the washing may be performed with an additional process such as a heat treatment or a polymer coating, and/or the like, thereby causing additional problems of complicating the process, increasing the production cost, and/or the like.

In a case of a low Ni-positive active material having a Ni content of less than about 80 mol %, as the residual Li is not present in an excessive amount, the water washing process may be not necessary, and thus, the BET specific surface area is not increased by the water washing, thereby not causing the related troubles, which are problems for the cycle-life deterioration and/or the like. Thus, in that case, it is not needed to further use the metal fluoride. Even if further using the same, the effects of improving the cycle-life characteristics caused by using the metal fluoride do not (or substantially do not) occur.

As the positive electrode according to an embodiment includes a metal fluoride, and the metal fluoride plays a role of suppressing or reducing the side reaction of the electrolyte, it may suppress or reduce the capacity deterioration and the cycle-life deterioration of the high Ni positive active material having a BET specific surface area of greater than or equal to about 0.5 m$^2$/g and a Ni content of greater than or equal to about 80 mol %. In addition, the metal fluoride may stabilize the unstable side reaction of the electrolyte and the positive active material surface. Thereby, the high Ni positive active material having a BET specific surface area of greater than or equal to about 0.5 m$^2$/g may be used for the positive electrode without performing an additional process such as a heating treatment as is otherwise done for positive active materials having a BET specific surface area of greater than or equal to about 0.5 m$^2$/g. In other words, the nickel-based positive active material according to an embodiment of the present disclosure may be performed with a water washing process for reducing the residual lithium, for example, a process of washing the active material with water.

The metal fluoride may be Al fluoride, Mg fluoride, Zr fluoride, Bi fluoride, or a combination thereof, and in an embodiment, may be Al fluoride. For example, it may be for example $AlF_3$, $MgF_2$, $BiF_3$, $ZrF_4$, or a combination thereof. In the case of using the Al fluoride, Mg fluoride, Zr fluoride, and/or Bi fluoride, capacity and cycle-life improvement effect may be more improved than in the case of using a fluoride of Cs, K, Li, and/or the like.

An amount of the metal fluoride may be about 1 wt % to about 10 wt %, according to an embodiment, about 1 wt % to about 5 wt %, or about 2 wt % to about 5 wt % based on a total amount, 100 wt % of the positive electrode layer. When the amount of the metal fluoride is within the above ranges, capacity, and cycle-life (e.g., room temperature cycle life characteristics) may be further improved while minimizing or reducing reduction of initial capacity and efficiency.

The metal fluoride may have an average particle diameter (D50) of less than or equal to about 3 μm, and, for example, may have an average particle diameter of about 0.1 μm to about 3 μm or an average particle diameter of about 0.5 μm to about 2.5 μm. Furthermore, it may have a secondary particle shape formed by agglomerating primary particles having an average particle diameter (D50) of less than or equal to about 3 μm.

The nickel-based positive active material may have a residual lithium content of about 0.05 wt % to about 0.3 wt % based on 100 wt % of the nickel-based positive active material. For example, the nickel-based positive active material may have a residual lithium content of about 0.05 wt % to about 0.2 wt %, about 0.1 wt % to about 0.2 wt %, or about 0.1 wt % to about 0.15 wt % (e.g. about 0.12 wt %) based on 100 wt % of the nickel-based positive active material.

In an embodiment, the positive active material may be a mixture of a large-diameter active material and a small-diameter active material. As in above, when a mixture of the large-diameter active material and the small-diameter active material is used as the positive active material, the capacity may be further increased.

The large-diameter active material may have an average particle diameter (D50) of about 15 μm to about 20 μm, and the small-diameter active material may have an average particle diameter (D50) of about 3 μm to about 5 μm. When the large-diameter active material and the small-diameter active material have average particle diameters within the foregoing ranges, it may provide a particle distribution having an appropriate or suitable density (g/cc). In this case, the large-diameter active material and the small-diameter active material may be mixed to a weight ratio of about 60:40 to about 80:20. When the mixing ratio of the large-diameter active material and small-diameter active material is within the foregoing range, it may provide a very high density (g/cc) on forming a positive electrode layer.

The metal fluoride may have an average particle diameter (D50) of about 0.5 μm to about 2.5 μm. For example, the metal fluoride may have an average particle diameter (D50) of about 0.5 μm to about 1.5 μm. For example, the metal fluoride may have an average particle diameter (D50) of about 1 μm. When the metal fluoride has the average particle diameter (D50) in this range, the metal fluoride is substantially uniformly distributed among positive active material particles, so as to further improve the effects caused by using the metal fluoride.

In the positive electrode layer, an amount of the positive active material may be about 86 wt % to about 97 wt % (e.g., about 86 wt % to about 96 wt %) based on a total weight of the positive electrode layer. An amount of the metal fluoride may be about 1 wt % to about 10 wt % (e.g., about 1 wt % to about 5 wt %, or about 2 wt % to about 5 wt %) based on a total weight of the positive electrode layer.

In the positive electrode layer, an amount of the binder may be about 0.5 wt % to about 2 wt % (e.g., about 1 wt % to about 2 wt %, about 1.5 wt % to about 2 wt %, or about 2 wt %) based on a total weight of the positive electrode layer. The binder may include polyvinyl alcohol, carboxymethyl cellulose, hydroxypropyl cellulose, diacetyl cellulose, polyvinylchloride, polyvinylfluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and/or the like, but is not limited thereto.

In the positive electrode layer, an amount of the conductive material may be about 0.5 wt % to about 2 wt % (e.g., about 1 wt % to about 2 wt %, about 1.5 wt % to about 2 wt %, or about 2 wt %) based on a total weight of the positive electrode layer. The conductive material may include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

The current collector supports the positive electrode layer.

The current collector may be an aluminum foil, a nickel foil, or a combination thereof, but is not limited thereto.

A method of manufacturing a positive electrode for a rechargeable lithium battery according to another embodiment includes mixing a nickel-based positive active material represented by Chemical Formula 1 having a BET specific surface area of about 0.5 m²/g to about 2.5 m²/g, a metal fluoride, a binder, and a conductive material in a solvent to prepare a positive active material composition and coating the positive active material composition on a current collector. The positive active material composition may be in a form of a slurry.

  Chemical Formula 1

In Chemical Formula 1, 0.9≤a≤1.1, 0.8≤x≤0.98, 0.01≤y≤0.1, 0.01≤z≤0.1, x+y+z=1, and A is Mn or Al.

In this case, the metal fluoride may be used in an amount of about 1 wt % to about 10 wt %, according to an embodiment, in an amount of about 1 wt % to about 5 wt % based on 100 wt % of the total amount of the nickel-based positive active material, the metal fluoride, the conductive material and the binder, which are the solid portion of the positive active material composition. When the metal fluoride is used in the foregoing amount, it may further minimize or reduce the reduction of the initial capacity and the efficiency, and it may also provide the positive electrode with further improved capacity and cycle-life (e.g., cycle-life characteristics at a room temperature).

The amounts of the positive active material, the conductive material, and the binder may be about 86 wt % to about 97 wt %, about 0.5 wt % to about 2 wt %, and about 0.5 wt % to about 2 wt %, respectively, based on the total amount of the nickel-based positive active material, the metal fluoride, the conductive material, and the binder which are the solids of the positive active material composition.

The positive active material, the metal fluoride, the conductive material, the binder, and the current collector may be used as described herein above. The solvent may be an organic solvent such as N-methyl pyrrolidone. After the positive active material composition is coated on a current collector, drying and pressing may further be performed. The coating, drying, and pressing processes may be performed according to any suitable process generally used in the art.

As in above, the positive electrode according to an embodiment may be obtained by adding a metal fluoride while preparing a slurry of a positive active material composition according to any suitable method utilized in the art for preparing a positive electrode. As such, an additional process is not required, and the generally-used positive electrode process and devices may be used as it is.

Another embodiment provides a rechargeable lithium battery including the positive electrode; a negative electrode; and an electrolyte.

The negative electrode includes a current collector and a negative electrode layer on the current collector and including a negative active material.

The negative active material includes any suitable material that reversibly intercalates/deintercalates lithium ions, a lithium metal, a lithium metal alloy, material capable of doping/dedoping lithium or transition metal oxide.

The material that reversibly intercalates/deintercalates lithium ions may be a carbon material that may be any suitable carbon-based negative active material generally used in a rechargeable lithium ion battery, and examples thereof may include crystalline carbon, amorphous carbon, or a combination thereof. The crystalline carbon may be shapeless (e.g., may have an unspecified shape), or may be sheet, flake, spherical, or fiber shaped natural graphite or artificial graphite and the amorphous carbon may be soft carbon or hard carbon, a mesophase pitch carbonized product, fired cokes, and/or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, SiO$_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, SnO$_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), and/or the like. At least one of these materials may be mixed with SiO$_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide and/or lithium titanium oxide.

In the negative electrode layer, an amount of a negative active material may be about 95 wt % to about 99 wt % based on a total amount of the negative electrode layer.

In an embodiment of the present disclosure, the negative electrode layer includes a binder, and, optionally, a conductive material. In the negative electrode layer, an amount of the binder may be about 1 wt % to about 5 wt % based on a total amount of the negative electrode layer. In addition, when it further includes a conductive material, it may include about 90 wt % to about 98 wt % of the negative active material, about 1 wt % to about 5 wt % of the binder, and about 1 wt % to about 5 wt % of the conductive material.

The binder improves binding properties of the negative active material particles with one another and with a current collector. The binder includes a non-aqueous binder, an aqueous binder, or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the negative electrode binder is an aqueous binder, a thickener (e.g., a cellulose-based compound) may be further used to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of about 0.1 parts by weight to about 3 parts by weight based on 100 parts by weight of the negative active material.

The conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The negative electrode may be formed by mixing a negative active material, a binder, and, optionally, a conductive material in a solvent to a slurry type (or kind) of negative active material composition, and coating the negative active material composition on a current collector. After the coating process, drying and compressing processes may be performed according to any suitable electrode manufacturing method generally used in the art. The solvent includes N-methylpyrrolidone and/or the like, but is not limited thereto. In addition, when the binder is a water-soluble binder, the solvent may be water.

The electrolyte includes a non-aqueous organic solvent and a lithium salt.

The non-aqueous organic solvent serves as a medium for transmitting ions taking part in the electrochemical reaction of a battery.

The non-aqueous organic solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, dimethyl acetate, methyl propionate, ethyl propionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (wherein R is a C2 to C20 linear, branched, or cyclic hydrocarbon group, or may include a double bond, an aromatic ring, or an ether bond), and the like, amides such as dimethyl formamide, and the like, dioxolanes such as 1,3-dioxolane, and the like, sulfolanes, and the like.

The organic solvent may be used alone or in a mixture. When the organic solvent is used in a mixture, the mixture ratio may be controlled in accordance with a desirable battery performance.

In addition, the organic solvent may further include an aromatic hydrocarbon-based organic solvent. Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4 trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive for improving the cycle-life characteristics of vinylene carbonate or an ethylene carbonate-based compound.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. An amount of the additive for improving the cycle-life characteristics may be used within an appropriate or suitable range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer in a range of 1 to 20), LiCl, LiI, and $LiB(C_2O_4)_2$ (lithium bis(oxalato) borate: LiBOB). A concentration of the lithium salt may be in a range of about 0.1 M to about 2.0 M. When the lithium salt is included at the above concentration range, an electrolyte may have excellent performance and lithium ion mobility due to suitable or optimal electrolyte conductivity and viscosity.

A separator may be between the positive electrode and the negative electrode depending on a type (or kind) of a rechargeable lithium battery. The separator may use polyethylene, polypropylene, polyvinylidene fluoride or multilayers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and the like.

The accompanying drawing is an exploded perspective view of a rechargeable lithium battery according to an embodiment. The rechargeable lithium battery according to an embodiment is illustrated as a prismatic battery but is not limited thereto and may include variously-shaped batteries such as a cylindrical battery, a pouch battery, and the like.

Referring to the accompanying drawing, a rechargeable lithium battery 100 according to an embodiment may include an electrode assembly 40 manufactured by winding a separator 30 between a positive electrode 10 and a negative electrode 20 and a case 50 housing the electrode assembly 40. An electrolyte may be impregnated in the positive electrode 10, the negative electrode 20 and the separator 30.

Hereinafter, examples of the present disclosure and comparative examples are described. The present disclosure, however, is not limited to these examples.

Example 1

A large-diameter compound of $Li_1Ni_{0.91}Co_{0.07}Al_{0.02}O_2$ having an average particle diameter (D50) of 18 μm and a small-diameter compound of $Li_1Ni_{0.91}Co_{0.07}Al_{0.02}O_2$ having an average particle diameter (D50) of 4 μm were mixed to 70:30 wt % to provide a mixture. The mixture was washed with water at a room temperature (25° C.) for one time to provide a positive active material.

The positive active material obtained by washing with water was measured for a BET specific surface area, and the results showed 2.11 $m^2/g$. In addition, the positive active material was measured for a remaining (e.g., a residual) Li content, and the results showed 0.12 wt %.

95 wt % of the obtained positive active material having a BET of 2.11 $m^2/g$, 1 wt % of $AlF_3$ having an average particle diameter (D50) of 1 μm, 2 wt % of a polyvinylidene fluoride binder, and 2 wt % of a carbon black conductive material were mixed in a N-methyl pyrrolidone solvent to provide a positive active material slurry.

The positive active material slurry was coated on an Al foil current collector and dried and pressed to provide a positive electrode including a positive electrode layer formed on the current collector.

Example 2

A positive electrode was prepared in accordance with substantially the same procedure as in Example 1, except that the amount of $AlF_3$ was changed from 1 wt % to 2 wt %, and 94 wt % of positive active material, 2 wt % of $AlF_3$, 2 wt % of a binder, and 2 wt % of a conductive material were used.

Example 3

A positive electrode was prepared in accordance with substantially the same procedure as in Example 1, except that the amount of $AlF_3$ was changed from 1 wt % to 3 wt %, and 93 wt % of positive active material, 3 wt % of $AlF_3$, 2 wt % of a binder, and 2 wt % of a conductive material were used.

Example 4

A positive electrode was prepared in accordance with substantially the same procedure as in Example 1, except that the amount of $AlF_3$ was changed from 1 wt % to 5 wt %, and 91 wt % of positive active material, 5 wt % of $AlF_3$, 2 wt % of a binder, and 2 wt % of a conductive material were used.

Example 5

A positive electrode was prepared in accordance with substantially the same procedure as in Example 1, except that the amount of $AlF_3$ was changed from 1 wt % to 10 wt %, and 86 wt % of positive active material, 10 wt % of $AlF_3$, 2 wt % of a binder, and 2 wt % of a conductive material were used.

Example 6

A positive electrode was prepared in accordance with substantially the same procedure as in Example 2, except that $MgF_2$ was used instead of $AlF_3$.

Example 7

A positive electrode was prepared in accordance with substantially the same procedure as in Example 2, except that $BiF_3$ was used instead of $AlF_3$.

Example 8

A positive electrode was prepared in accordance with substantially the same procedure as in Example 2, except that $ZrF_4$ was used instead of $AlF_3$.

Comparative Example 1

A large-diameter compound of $Li_1Ni_{0.91}CO_{0.07}Al_{0.02}O_2$ having an average particle diameter (D50) of 18 μm and a small-diameter compound of $Li_1Ni_{0.91}Co_{0.07}Al_{0.02}O_2$ having an average particle diameter (D50) of 4 μm were mixed to 70:30 wt % to provide a positive active material. The obtained positive active material was measured for a BET specific surface area, and the results showed 0.38 $m^2/g$. In addition, the positive active material was measured for a residual Li content, and the results showed 0.55 wt %.

96 wt % of the positive active material having the BET specific surface area of 0.38 $m^2/g$, 2 wt % of a polyvinylidene fluoride binder, and 2 wt % of a carbon black conductive material were mixed in a N-methyl pyrrolidone solvent to provide a positive active material slurry.

The positive active material slurry was coated on an Al foil current collector, dried, and pressed to provide a positive electrode including a positive electrode layer formed on the current collector.

Comparative Example 2

A large-diameter compound of $Li_1Ni_{0.91}Co_{0.07}Al_{0.02}O_2$ having an average particle diameter (D50) of 18 μm and a small-diameter compound of $Li_1Ni_{0.91}CO_{0.07}Al_{0.02}O_2$ having an average particle diameter (D50) of 4 μm were mixed to 70:30 wt % to provide a mixture. The mixture was washed with water at a room temperature (25° C.) for one time to provide a positive active material. The obtained positive active material was measured for a BET specific surface area, and the results showed 2.11 $m^2/g$.

96 wt % of the obtained positive active material having BET of 2.11 $m^2/g$, 2 wt % of a polyvinylidene fluoride binder, and 2 wt % of a carbon black conductive material were mixed in a N-methyl pyrrolidone solvent to provide a positive active material slurry.

The positive active material slurry was coated on an Al foil current collector, dried, and pressed to provide a positive electrode including the positive electrode layer formed on the current collector.

Comparative Example 3

A large-diameter compound of $Li_1Ni_{0.91}Co_{0.07}Al_{0.02}O_2$ having an average particle diameter (D50) of 18 μm and a small-diameter compound of $Li_1Ni_{0.91}Co_{0.07}Al_{0.02}O_2$ having an average particle diameter (D50) of 4 μm were mixed to 70:30 wt % to provide a positive active material. The obtained positive active material was measured for a BET specific surface area, and the results show 0.38 m$^2$/g. In addition, the positive active material was measured for a residual Li content, and the results showed 0.55 wt %.

94 wt % of the positive active material having the BET specific surface area of 0.38 m$^2$/g, 2 wt % of $AlF_3$ having an average particle diameter (D50) of 1 μm, 2 wt % of a polyvinylidene fluoride binder, and 2 wt % of a carbon black conductive material were mixed in a N-methyl pyrrolidone solvent to provide a positive active material slurry.

The positive active material slurry was coated on an Al foil current collector, dried, and pressed to provide a positive electrode including a positive electrode layer formed on the current collector.

Comparative Example 4

A positive electrode was prepared in accordance with substantially the same procedure as in Comparative Example 3, except that a $Li_1Ni_{0.6}Co_{0.2}Mn_{0.2}O_2$ compound having an average particle diameter (D50) of 10 μm was used as a positive active material, instead of the large-diameter compound of $Li_1Ni_{0.91}Co_{0.07}Al_{0.02}O_2$ having an average particle diameter (D50) of 18 μm and the small-diameter compound of $Ni_{0.91}Co_{0.07}Al_{0.02}O_2$ having an average particle diameter (D50) of 4 μm. The obtained positive active material was measured for a residual Li content, and the results showed 0.07 wt %.

Comparative Example 5

A positive electrode was prepared in accordance with substantially the same procedure as in Comparative Example 4, except that $AlF_3$ was not used.

Comparative Example 6

A positive electrode was prepared in accordance with substantially the same procedure as in Example 1, except the $AlF_3$ content was changed from 1 wt % to 15 wt %.

Comparative Example 7

A positive electrode was fabricated in accordance with substantially the same procedure as in Example 1, except the $AlF_3$ content was changed from 1 wt % to 20 wt %.

Comparative Example 8

A $Li_1Ni_{0.6}Co_{0.2}Mn_{0.2}O_2$ positive active material having an average particle diameter (D50) of 10 μm and a BET specific surface area of 0.38 m$^2$/g was prepared.

94 wt % of the positive active material, 2 wt % of $AlF_3$ having an average particle diameter (D50) of 1 μm, 2 wt % of a polyvinylidene fluoride binder, and 2 wt % of a carbon black conductive material were mixed in a N-methyl pyrrolidone solvent to provide a positive active material slurry.

The positive active material slurry was coated on an Al foil current collector, dried, and pressed to provide a positive electrode including the positive electrode layer formed on the current collector.

Comparative Example 9

A positive electrode was prepared in accordance with substantially the same procedure as in Comparative Example 8, except that $AlF_3$ was not used.

Evaluation Example 1: Measurement of Residual Lithium and BET Specific Surface Area A residual lithium content and a BET specific surface area of each positive active material according to Examples 1 to 8 and Comparative Examples 1 to 9 were measured as follows, and the results are shown in Table 1.

The residual lithium content was measured by an acid-base titration. 50 g of the obtained active material was added with 100 ml of ultra-pure water into a beaker and stirred, then the stirred solution was separated to a solution and powder using a filter paper, and then a pH titration was performed on the obtained solution using 0.1 N hydrochloric acid to determine the amount of residual lithium.

The BET specific surface area was measured using physical adsorption and chemical adsorption phenomena utilizing a Brunauer-Emmett-Teller (BET) method. In other words, the obtained active material was weighed, and then nitrogen was absorbed on the surface of active material to measure the absorbed nitrogen gas volume, and then the BET specific surface area was obtained using a BET Calculation Equation. In Table 1, the positive active materials according to Comparative Examples 4, 5, 8 and 9 were positive active materials of $Li_1Ni_{0.6}Co_{0.2}Mn_{0.2}O_2$.

TABLE 1

| | Positive active material (wt %) | Metal fluoride (wt %) | Binder (wt %) | Conductive material (wt %) | Water washing | Residual lithium (wt %) | Specific surface area (m$^2$/g) |
|---|---|---|---|---|---|---|---|
| Example 1 | 95 | $AlF_3$, 1 | 2 | 2 | ○ | 0.12 | 2.11 |
| Example 2 | 94 | $AlF_3$, 2 | 2 | 2 | ○ | 0.12 | 2.11 |
| Example 3 | 93 | $AlF_3$, 3 | 2 | 2 | ○ | 0.12 | 2.11 |
| Example 4 | 91 | $AlF_3$, 5 | 2 | 2 | ○ | 0.12 | 2.11 |
| Example 5 | 86 | $AlF_3$, 10 | 2 | 2 | ○ | 0.12 | 2.11 |
| Example 6 | 94 | $MgF_2$, 2 | 2 | 2 | ○ | 0.12 | 2.11 |
| Example 7 | 94 | $BiF_3$, 2 | 2 | 2 | ○ | 0.12 | 2.11 |
| Example 8 | 94 | $ZrF_4$, 2 | 2 | 2 | ○ | 0.12 | 2.11 |
| Comparative Example 1 | 96 | X | 2 | 2 | X | 0.55 | 0.38 |

TABLE 1-continued

| | Positive active material (wt %) | Metal fluoride (wt %) | Binder (wt %) | Conductive material (wt %) | Water washing | Residual lithium (wt %) | Specific surface area ($m^2/g$) |
|---|---|---|---|---|---|---|---|
| Comparative Example 2 | 96 | X | 2 | 2 | ○ | 0.12 | 2.11 |
| Comparative Example 3 | 94 | $AlF_3$, 2 | 2 | 2 | X | 0.55 | 0.38 |
| Comparative Example 4 | 94 | $AlF_3$, 2 | 2 | 2 | X | 0.07 | 0.42 |
| Comparative Example 5 | 96 | X | 2 | 2 | X | 0.07 | 0.42 |
| Comparative Example 6 | 81 | $AlF_3$, 15 | 2 | 2 | ○ | 0.12 | 2.11 |
| Comparative Example 7 | 76 | $AlF_3$, 20 | 2 | 2 | ○ | 0.12 | 2.11 |
| Comparative Example 8 | 94 | $AlF_3$, 2 | 2 | 2 | X | 0.07 | 0.38 |
| Comparative Example 9 | 96 | X | 2 | 2 | X | 0.07 | 0.38 |

As shown in the Table 1, by performing the water washing process, the BET specific surface area was increased as in Example 1 and Comparative Example 2 by decreasing the residual Li content.

Evaluation Example 2: Slurry Stability

Each positive active material slurry according to Examples 1 to 5 and Comparative Examples 1 and 2 was allowed to stand at a room temperature for 3 days, and whether the layer was separated or not was determined. The results are shown in Table 2.

TABLE 2

| | Slurry phase stability |
|---|---|
| Example 1 | No layer separation |
| Example 2 | No layer separation |
| Example 3 | No layer separation |
| Example 4 | No layer separation |
| Example 5 | No layer separation |
| Comparative Example 1 | No layer separation |
| Comparative Example 2 | Layer separation occurs |

As shown in Table 2, the layer separation was not occurred in Examples 1 to 5 in which $AlF_3$ was added into the positive active material having the BET specific surface area of about 2.11 $m^2/g$, so it is understood that a slurry phase stability was excellent. On the contrary, in a case of Comparative Example 2 in which $AlF_3$ was not added into the positive active material having the BET specific surface area of 2.11 $m^2/g$, the layer separation was occurred, so it is understood that the slurry phase stability was unfavorable.

On the other hand, in a case of Comparative Example 1 using the positive active material having the low BET specific surface area of 0.38 $m^2/g$, it is understood that the layer separation was not occurred even without adding $AlF_3$. From the results, it is understood that the layer separation was occurred if using the positive active material having the BET specific surface area of greater than or equal to 0.5 $m^2/g$, which may be suppressed or reduced by adding $AlF_3$.

Evaluation Example 3: Adherence to Current Collector

For each positive electrode according to Examples 1 to 5 and Comparative Examples 1 to 2, an adherence of between the current collector and the positive electrode layer was measured as follows: a sample in which a slide glass was attached to the positive electrode by a double-sided adhesive tape was prepared, and then the sample was measured by a UTM tensile strength tester at 180° C., and the results are shown in Table 3.

TABLE 3

| | Adherence (gf/mm) |
|---|---|
| Example 1 | 28.8 |
| Example 2 | 28.3 |
| Example 3 | 27.8 |
| Example 4 | 27.1 |
| Example 5 | 26.2 |
| Comparative Example 1 | 26.5 |
| Comparative Example 2 | 20.1 |

As shown in Table 3, in the cases of Examples 1 to 5 in which $AlF_3$ was added into the positive active material having the BET specific surface area of 2.11 $m^2/g$, the adherence was significantly superior to Comparative Example 2 including the positive active material having the equivalent BET specific surface area. In addition, in the cases of Examples 1 to 4, the adherence was more excellent than in Comparative Example 1 including the positive active material having the low BET specific surface area of 0.38 $m^2/g$.

From the results, it was determined that the adherence is enhanced when $AlF_3$ is added into the positive active material having the BET specific surface area of greater than or equal to 0.5 $m^2/g$.

Evaluation Example 4: Initial Charge and Discharge Characteristics

A half-cell was fabricated using the positive electrode obtained from Examples 1 to 8 and Comparative Examples 1 to 9, a lithium metal counter electrode, and an electrolyte. The electrolyte was prepared by dissolving 1.0 M of $LiPF_6$ in a mixed solvent of ethylene carbonate and diethyl carbonate (50:50 volume ratio).

The obtained half-cell using the positive electrode according to Examples 1 to 8 and Comparative Examples 1 to 7 was performed with a charge and discharge at 0.1 C for one time and measured for a charge and discharge capacity, and then the initial efficiency and the initial discharge capacity results of Examples 1 to 8 and Comparative Examples 1 to 7 are shown in Table 4. Furthermore, the results of Comparative Examples 8 and 9 are shown in Table 5.

Evaluation Example 5: High Rate Capability

The half-cell obtained from Evaluation Example 4 was performed with a charge and discharge at 0.2 C for one time and performed with a charge and discharge at 1 C for one time. A rate of the 1 C discharge capacity to the 0.2 C discharge capacity was calculated, and then the results of Examples 1 to 8 and Comparative Examples 1 to 7 are shown in Table 4. Furthermore, the results of Comparative Examples 8 and 9 are shown in Table 5.

Evaluation Example 6: Cycle-Life Characteristics

The obtained half-cell was performed with a charge and discharge at a room temperature (25° C.) at 1 C for 50 times, and a rate of the 50th discharge capacity to the first discharge capacity was calculated, and the results of Examples 1 to 8 and Comparative Examples 1 to 7 are shown in Table 4. Furthermore, the results of Comparative Examples 8 and 9 are shown in Table 5.

As shown in Table 4, it can be seen that the cases of Examples 2 to 5 using $AlF_3$ in 2 to 10 wt % and Example 6 to 8 using $MgF_2$, $BiF_3$, and $ZrF_4$ in 2 wt % showed more excellent cycle characteristics than Comparative Examples 1 and 2.

For example, in the cases of Examples 2 and 3 using $AlF_3$ in 2 wt % and 3 wt % and Example 6 to 8 using $MgF_2$, $BiF_3$, and $ZrF_4$ in 2 wt %, all of the initial efficiency, the high rate capability, and the cycle characteristics showed excellent results.

On the other hand, in the cases of Comparative Examples 1 and 3 not performing the water washing, the residual lithium content was high, which may generate gas, so that it may deteriorate the thermal stability.

In addition, in Example 1 and Comparative Example 2 performing the water washing, it can be seen that the initial efficiency and the high rate capability were improved by adding $AlF_3$, for example, the cycle-life characteristics were significantly improved. From the results, the effects on improving the battery characteristics caused by adding $AlF_3$ into the positive active material performed with the water washing are clearly observed.

In addition, in a case of Comparative Example 3 in which $AlF_3$ was added into the positive active material having the

TABLE 4

| | Metal fluoride (wt %) | Water washing | Residual lithium (wt %) | Specific surface area (m²/g) | Initial efficiency (%) | Initial discharge capacity (mAh/g) | High rate capability (%) | Cycle-life Characteristics (%) |
|---|---|---|---|---|---|---|---|---|
| Example 1 | $AlF_3$, 1 | ○ | 0.12 | 2.11 | 90.7 | 210.6 | 89.5 | 82 |
| Example 2 | $AlF_3$, 2 | ○ | 0.12 | 2.11 | 90.6 | 210.1 | 90.1 | 85 |
| Example 3 | $AlF_3$, 3 | ○ | 0.12 | 2.11 | 90.1 | 207.3 | 90.3 | 87 |
| Example 4 | $AlF_3$, 5 | ○ | 0.12 | 2.11 | 89.4 | 205.8 | 89.2 | 87 |
| Example 5 | $AlF_3$, 10 | ○ | 0.12 | 2.11 | 88.7 | 200.2 | 88.8 | 92 |
| Example 6 | $MgF_2$, 2 | ○ | 0.12 | 2.11 | 90.3 | 209.8 | 90.3 | 86 |
| Example 7 | $BiF_3$, 2 | ○ | 0.12 | 2.11 | 90.4 | 210.4 | 90.5 | 88 |
| Example 8 | $ZrF_4$, 2 | ○ | 0.12 | 2.11 | 90.3 | 210.0 | 90.5 | 86 |
| Comparative Example 1 | X | X | 0.55 | 0.38 | 89.5 | 219.3 | 89.9 | 83 |
| Comparative Example 2 | X | ○ | 0.12 | 2.11 | 89.1 | 211.7 | 88.4 | 73 |
| Comparative Example 3 | $AlF_3$, 2 | X | 0.55 | 0.38 | 89.3 | 218.8 | 89.6 | 84 |
| Comparative Example 4 | $AlF_3$, 2 | X | 0.07 | 0.42 | 90.7 | 174.3 | 92.4 | 91 |
| Comparative Example 5 | X | X | 0.07 | 0.42 | 91.1 | 175.8 | 92.9 | 90 |
| Comparative Example 6 | $AlF_3$, 15 | ○ | 0.12 | 2.11 | 85.1 | 188.7 | 87.1 | 91 |
| Comparative Example 7 | $AlF_3$, 20 | ○ | 0.12 | 2.11 | 81.4 | 176.1 | 85.3 | 92 |

TABLE 5

| | Types of positive active material | $AlF_3$ amount (wt %) | Initial efficiency (%) | Initial discharge capacity (mAh/g) | High rate capability (1 C/0.2 C, %) | Cycle characteristics (50th/1st, %) |
|---|---|---|---|---|---|---|
| Comparative Example 8 | NCM622 | 2 | 90.7 | 174.3 | 92.4 | 91 |
| Comparative Example 9 | NCM622 | 0 | 91.1 | 175.8 | 92.9 | 90 | low BET specific surface area of 0.38 m²/g, comparing Comparative Example 1 including the same positive active material while not adding AlF₃, the effects on improving the cycle-life characteristics were insignificant, and the initial efficiency, the initial discharge capacity, and the high rate capability were even deteriorated. Thereby, it can clearly be seen that the effects caused by adding AlF₃ into the positive active material having the low BET specific surface area of 0.38 m²/g may not obtained even if the Ni content was greater than or equal to 80 mol %, but even it may be deteriorated.

In addition, in Comparative Examples 6 and 7 including an excessive amount of 15 wt % and 20 wt % even if using AlF₃, the results showed excellent cycle-life characteristics, but the high rate capability was low, and the initial efficiency and the discharge capacity were significantly deteriorated.

Furthermore, as shown in Table 4, in a case of using the positive active material having a Ni content of less than or equal to 80 mol %, it is confirmed that the residual lithium content was slightly low, but the effects caused by using the metal fluoride were insignificant even if not performing the water washing process.

In Table 5, NCM622 indicates $Li_1Ni_{0.6}Co_{0.2}Mn_{0.2}O_2$.

As shown in Table 5, it can be seen that in the case of using the positive active material of NCM622 in which the Ni content was 60 mol %, the cycle-life characteristic improvement effects were insignificant, and the initial efficiency, the initial discharge capacity, and the rate capability were even deteriorated even if adding AlF₃ as in Comparative Example 8, as compared to Comparative Example 9 using no AlF₃.

From the results, it can be seen that the effects caused by using the metal fluoride may be not obtained in the low Ni positive active material having the Ni content of less than about 80 mol %.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the appended claims, and equivalents thereof.

What is claimed is:

1. A positive electrode for a rechargeable lithium battery, comprising:
a current collector; and
a positive electrode layer on the current collector, the positive electrode layer comprising a physical mixture of a nickel-based positive active material represented by Chemical Formula 1 having a BET specific surface area of about 0.5 m²/g to about 2.5 m²/g, metal fluoride particles, a conductive material, and a binder,
wherein an amount of the metal fluoride particles is about 2 wt % to about 10 wt % based on 100 wt % of the positive electrode layer, $$Li_aNi_xCo_yA_zO_2 \quad \text{[Chemical Formula 1]}$$

wherein, in Chemical Formula 1, 0.9≤a≤1.1, 0.8≤x≤0.98, 0.01≤y≤0.1, 0.01≤z≤0.1, x+y+z=1, and A is Mn or Al,
wherein the metal fluoride particles comprise Al fluoride particles, Mg fluoride particles, Zr fluoride particles, Bi fluoride particles, or a combination thereof,
wherein the metal fluoride particles have an average particle diameter (D50) of about 0.1 μm to about 3 μm, and
wherein the nickel-based positive active material represented by Chemical Formula 1 has a residual lithium content of about 0.05 wt % to about 0.3 wt % based on 100 wt % of the nickel-based positive active material.

2. The positive electrode of claim 1, wherein the positive active material is a mixture of a large-diameter active material and a small-diameter active material.

3. The positive electrode of claim 1, wherein the positive active material is a mixture of a large-diameter active material having an average particle diameter (D50) in a range of about 15 μm to about 20 μm and a small-diameter active material having an average particle diameter (D50) in a range of about 3 μm to about 5 μm.

4. The positive electrode of claim 1, wherein a mixing ratio of the large-diameter active material and the small-diameter active material is a weight ratio of about 60:40 to about 80:20.

5. The positive electrode of claim 1, wherein the nickel-based positive active material is washed with water.

6. A method of manufacturing the positive electrode for a rechargeable lithium battery of claim 1, the method comprising:

mixing the nickel-based positive active material represented by Chemical Formula 1, the metal fluoride particles, the binder, and the conductive material in a solvent to prepare a positive active material composition; and coating the positive active material composition on a current collector.

7. The method of claim 6, wherein before preparing the positive active material composition, the positive active material is washed with water.

8. A rechargeable lithium battery comprising:
the positive electrode of claim 1;
a negative electrode comprising a negative active material; and
an electrolyte.

* * * * *